Sept. 3, 1957  K. K. BRUECKNER  2,804,681
METHOD OF FORMING CURVED RACK BARS
Filed March 8, 1954
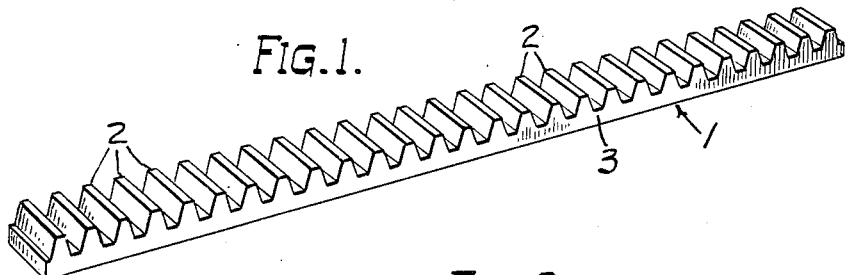
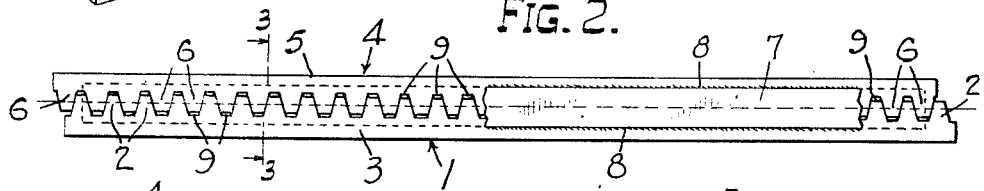
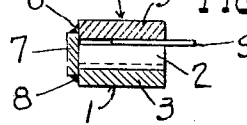
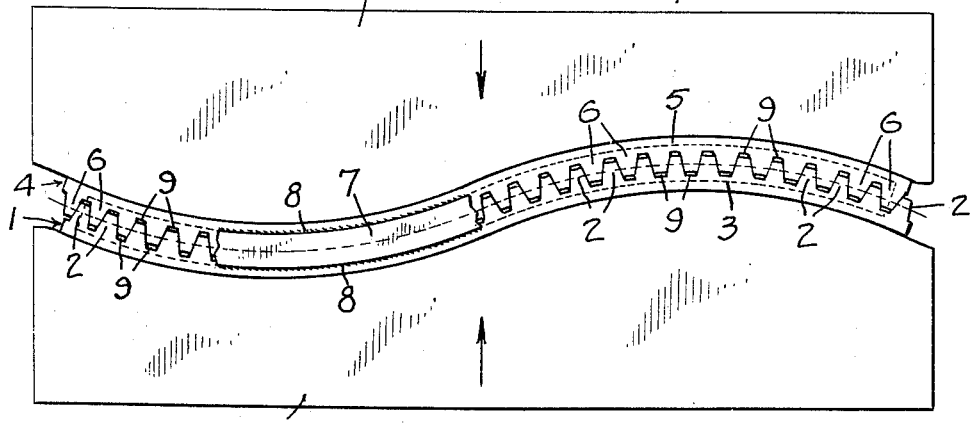
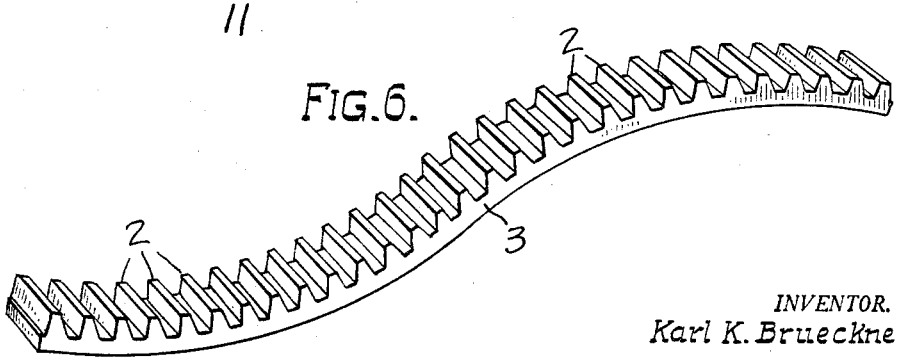
INVENTOR.
Karl K. Brueckner
BY Andrus & Sceales
ATTORNEYS.

United States Patent Office 2,804,681
Patented Sept. 3, 1957

2,804,681

METHOD OF FORMING CURVED RACK BARS

Karl K. Brueckner, Milwaukee, Wis., assignor to A. O. Smith Corporation, Milwaukee, Wis., a corporation of New York Application March 8, 1954, Serial No. 414,735

3 Claims. (Cl. 29—159.2)

This invention relates to a method of forming curved rack bars.

Heretofore, unusual curved rack contours of constant pitch dimension over the length of the rack have been machined at great expense from pieces of metal stock large enough to accommodate the curved rack. Since the curved rack required only a fraction of the metal of the original stock piece, large amounts of scrap resulted.

According to this invention a rack of given pitch dimension, tooth form, and desired curvature is formed from a straight rack of the given pitch dimension. The original straight rack is placed in a press and bent to the desired curvature with the original pitch dimension being maintained constant or substantially constant throughout the bending operation.

More specifically according to the invention, the rack to be formed into the desired curvature is placed in meshing engagement with a second rack having teeth of the same pitch dimension and tooth form spaced on a base portion. The engaged racks are secured together to form a composite structure. The composite structure is then placed in a press provided with die members which are actuated to impart the desired curvature to the structure. The stresses induced in the composite structure as the die members move relatively to each other to bend the structure exceed the yield point of the rack material to permanently deform the structure. Upon removal from the press the curved racks are separated. Ordinarily only one of the curved racks has the contour desired for a specific application and the other is discarded.

The method outlined above provides a pair of curved racks whose pitch dimension is substantially the same as it was when they were straight, provided the base portions of the respective racks forming the composite structure are of equal thickness. The composite structure formed of racks having base portions of equal thickness have a neutral stress axis proximately to the pitch lines of the respective racks and consequently the pitch dimension of the racks remains substantially constant since deformation at the pitch lines would be very little during bending. Where only the one rack is desired for a specific application, deformation at the pitch line of the desired rack may be further minimized or eliminated completely by proportioning the thickness of the respective base portions of the racks forming the composite structure to have the neutral stress axis of the structure fall on the pitch line of the desired rack.

The drawing furnished herewith illustrates the best mode of carrying out the invention as presently contemplated and set forth hereinafter.

In the drawing:

Figure 1 shows in perspective the rack to be bent into the desired curvature;

Fig. 2 is a side elevation with parts broken away of a pair of racks assembled together in preparation for the bending operation;

Fig. 3 is a sectional view of the engaged racks taken on line 3—3 of Fig. 2 showing the insertion of a spacer element;

Fig. 4 is a sectional view similar to that of Fig. 3 showing the racks as assembled and fastened together prior to the bending operation;

Fig. 5 shows the mating racks between the die members after the bending operation has been completed; and Fig. 6 is a perspective view of the finished rack having the desired curvature.

To fabricate a curved rack in accordance with the method of this invention, a straight rack 1 of the desired length having teeth 2 of given pitch dimension longitudinally spaced on a base portion 3 is placed in meshing engagement with a second straight rack 4. The second rack 4 is provided with a base portion 5 of equal thickness to base portion 3 and the teeth 6 projecting from base 5 have the same pitch dimension and tooth form as teeth 2 of rack 1.

The racks 1 and 4 are next held or secured together by strips of metal 7 welded by welds 8 to each side of the assembled racks. The metal strips 7 should be somewhat wider than the tooth height of the respective racks and are disposed to fully cover the teeth so that the welds 8 will secure the side edges of each metal strip to the respective base portions 3 and 5 of the racks. The racks thus secured form the composite structure shown in Fig. 2 and Fig. 4 and have a neutral stress axis shown by the dash line in Fig. 2 which is proximate to the pitch lines of each respective rack.

The base portions of the respective racks may initially be machined to equal thickness or after assembly into the composite structure.

When desired, small spacer elements 9 may be inserted between the crest of each tooth and its complementary root surface to insure against deformation of the teeth along the medial line during the subsequent bending operation. To be most effective spacer elements 9 have a cross section similar to that of the gaps remaining between the teeth and complementary root surfaces of the meshing racks. The spacer elements 9 are most readily inserted before the strips 7 are welded in position or after one of the strips has been welded onto the assembled racks. Fig. 3 shows the insertion of a spacer element after one strip has been welded onto the assembled racks.

In order to bend the racks to the curvature desired, the composite structure is next placed in a press eqiupped with upper die 10 and lower die 11. The dies are then closed onto the composite structure and the engaged racks are thereupon subjected to stresses above their yield point to impart a permanent set to the racks to the desired curvature. Since the pitch lines of the respective racks are proximate the neutral stress axis of the composite structure, there is very little deformation at the pitch lines of the engaged racks. Where the racks are formed cold, from a material having a degree of elasticity, allowance must be made in the dies for a small amount of springback in the rack material upon removal from the dies.

The racks are next removed from between the dies 10 and 11, and welds 8 and strips 7 are removed and the racks are separated. The rack 1 formed with the desired curvature may be case hardened or otherwise treated in preparation for the service intended.

Although the invention is directed to forming a single rack of a desired curvature, two curved racks are formed in carrying out the invention. In some instances the one curved rack that results from the method of this invention may be discarded, however, it is contemplated that both curved racks can be utilized. Thus the invention provides a method of forming a pair of curved racks simultaneously while maintaining the desired pitch dimension substantially constant during the bending of the racks to the curved contour desired.

Where only the one rack of the composite structure is desired for a specific application and the other is to be discarded, deformation on the pitch line of the desired rack may be further minimized. This may be accomplished by proportioning the thickness of the respective base portions of the racks so as to dispose the neutral stress axis on the pitch line of the desired rack. If the racks initially have base portions of equal thickness, removing a thickness of material from the base portion of the rack to be discarded equal to the small distance between the neutral stress axis and the pitch line of the desired rack moves the neutral stress axis of the composite structure so that it falls on the pitch line of the desired rack. Since there is no deformation on the neutral stress axis during bending of the engaged racks, the pitch dimension of the desired rack should remain substantially constant during the bending operation. The base portions of the respective racks may be machined to their proportionate thicknesses initially or after assembly into the composite structure prior to the bending operation.

Various modes of carrying out the invention are contemplated as within the scope of the following claims particularly pointing out and distinctly claiming the subject matter which is regarded as the invention.

I claim:

1. The method of forming curved rack bars, which comprises meshing together a pair of straight rack bars having substantially identical teeth, securing the meshed bars against relative movement, then bending the meshed bars in a direction generally corresponding to the height of the teeth on said bars to impart a permanent curvature to the bars, and thereafter separating said rack bars.

2. The method of claim 1 wherein the rack bars are secured together by welding strips of metal to the respective sides of the rack bars.

3. The method of claim 1 and the additional step of inserting removable spacer elements between each tooth crest of the teeth of each rack bar and the complementary roots of the teeth of the other rack bar to further prevent any substantial deformation of the teeth during bending of the rack bars.

References Cited in the file of this patent

UNITED STATES PATENTS

| 980,950 | Hiering | Jan. 10, 1911 |
| 1,582,571 | Budd | Apr. 27, 1926 |
| 1,654,037 | Clark | Dec. 27, 1927 |
| 1,670,476 | Nicholson | May 22, 1928 |
| 2,044,322 | Oliver | June 16, 1936 |
| 2,088,120 | Smith | July 27, 1937 |
| 2,144,915 | Derby | Jan. 24, 1939 |
| 2,489,993 | Wood | Nov. 29, 1949 |
| 2,558,877 | Ress | July 3, 1951 |
| 2,645,842 | Orr | July 21, 1953 |